United States Patent [19]
Stein et al.

[11] 3,744,479
[45] July 10, 1973

[54] SYNCHRONIZED ULTRASONIC DIAGNOSTIC FOR INTERNAL ORGAN FUNCTION TESTING

[75] Inventors: Arno Stein, Boulder; Alan R. Owens; William L. Wright, both of Longmont, all of Colo.

[73] Assignee: Picker Electronics, Inc., Longmont, Colo.

[22] Filed: Feb. 25, 1971

[21] Appl. No.: 118,920

[52] U.S. Cl............. 128/2 S, 128/2 V, 128/2.05 R, 128/2.06 R, 128/24 A
[51] Int. Cl............................................... A61b 5/10
[58] Field of Search............... 128/2 R, 2 S, 2 V, 128/2.05 A, 2.05 F, 2.05 M, 2.05 R, 2.05 S, 24 A, 2.06 R

[56] References Cited
UNITED STATES PATENTS

| | | | |
|---|---|---|---|
| 2,933,081 | 4/1960 | Passannante | 128/2.05 B |
| 3,344,275 | 9/1967 | Marchal et al. | 128/2 A |
| 3,624,744 | 11/1971 | Munger | 128/2 V |

*Primary Examiner*—William E. Kamm
*Attorney*—Watts, Hoffmann, Fisher & Heinke

[57] ABSTRACT

A clinical monitoring system including an ultrasound system which is operated in conjunction with another physiological monitoring system, such as an electrocardiograph, for providing a composite visual presentation of both ultrasound data and other physiological data. The clinical monitoring system also includes circuitry for electrically synchronizing and for combining the ultrasound data and the other physiological data so that both sets of data are simultaneously presented and are correlated with respect to each other relative to time. The ultrasound data and the other physiological data are electrically synchronized with respect to each other and are simultaneously presented in time correlation with respect to each other.

29 Claims, 3 Drawing Figures

1

SYNCHRONIZED ULTRASONIC DIAGNOSTIC FOR INTERNAL ORGAN FUNCTION TESTING

CROSS REFERENCES TO RELATED PATENT APPLICATIONS AND PATENTS

United States Patent Application, Ser. No. 62,143, entitled "Sector Scanning Ultrasonic Inspection Apparatus," filed on Aug. 7, 1970, and assigned to the same assignee as the present invention.

BACKGROUND OF THE INVENTION

This invention pertains to the art of clinical apparatus and method of operation, and more particularly, to a monitoring system for presenting a visual presentation of ultrasonic data and other physiological data, such as electrocardiograph data, in time correlation.

Ultrasound systems have been used to analyze the functioning of internal organs of the human body. Generally, in the A-mode form of display, ultrasound echoes are represented as vertical "spikes" on a horizontal line. If a functioning organ, such as a valve in a heart, is monitored with an ultrasound system, a recording may be made of the distance of the vertical "spikes" relative to time in order to evaluate the relative position of the organ with respect to time. Such a recording provides valuable diagnostic information.

Various other physiological monitoring systems have also been utilized to analyze the functioning of internal organs. For example, the electrocardiograph provides a continuous recording, i.e., an electrocardiogram, of the fluctuations of the electrical potentials generated by the heart during cardiac cycles. The recording is generally made on a sheet of paper which is moved at a constant rate of speed relative to a marking pen. A linear scale may then be applied to the paper in order to relate the fluctuations of the electrical potentials with respect to them.

The electrocardiograph provides clues to certain types of heart disorders. These clues are obtained by inspection of the electrocardiogram. For example, the magnitude of the voltages at different points along the electrocardiogram, the rapidity or frequency of fluctuations, and the shapes of the different portions of the voltage waveforms, all provide valuable diagnostic information. The physician, however, must make very accurate measurements of these variables of the electrocardiogram in order to properly interpret their meaning.

In analyzing or evaluating the functioning of certain organs of the human body, it is desirable to compare the data obtained by one physiological monitoring system, as an ultrasound system, with data obtained by another physiological monitoring system, such as for example an electrocardiograph. Frequently, the recording which is made by one of these systems, is placed along side the recording made by the other system in an attempt to evaluate the fluctuations occurring on one recording with the fluctuations occurring on the other recording. This procedure of side-by-side evaluation of two different recordings has been generally found to be relatively satisfactory for most evaluations; however, frequently it is desirable to know the exact relative position of a functioning organ at the exact instant in time when a particular fluctuation occurs in other physiological data.

For example, in evaluating the functioning of the heart valve, it is desirable to know the relative position of the heart valve at the particular instant in time the electrical potential generated by the heart reaches a maximum value. This evaluation is difficult at best by comparing two different recordings and by attempting to correlate points in time in one recording with corresponding points in time on the other recording.

It has been found to be highly desirable to present ultrasound data, as well as other physiological data, such as electrocardiogram data, on a single composite visual presentation. It has also been found to be desirable to synchronize the ultrasound data with the electrocardiogram data so that these two sets of data are correlated with respect to each other relative to time.

SUMMARY OF THE INVENTION

The present invention is directed toward a clinical monitoring system and method of operation for analyzing the functioning of internal organs of the human body by presenting ultrasound data and other physiological data in time correlation, thereby overcoming the noted disadvantages and others, of such previous systems.

In accordance with one aspect of the present invention, there is provided a monitoring system for diagnosing the functioning of internal organs. The monitoring system includes a pulse generator for developing a train of time-spaced pulses, a transducer coupled to the pulse generator for emitting and receiving ultrasonic waves, and a converter circuit for converting the ultrasonic waves into electrical signals. The monitoring system also includes a physiological amplifier, such as an electrocardiograph amplifier, having an input circuit for receiving signals representative of physiological information, such as electrical potentials generated during cardiac cycles. A reference signal generator, such as a ramp function generator, is coupled to a signal comparator for, upon the receipt of one of the time-spaced pulses, applying a reference signal to the signal comparator. The physiological amplifier is also coupled to the signal comparator so that when the signal developed by the amplifier reaches a predetermined value with respect to the reference signal, an output signal is developed by the signal comparator. The signal developed by the signal comparator, as well as the signal developed by the converter circuit, are applied to a video amplifier. The signals developed by the video amplifier are then applied to an indicator device, such as a cathode ray tube, representative of both ultrasonic data and other physiological data.

In accordance with another aspect of the present invention, the monitoring system includes a signal generator which is also coupled to the signal comparator. The signal generator develops a signal having a value representative of a preselected depth to be evaluated. Also, the signal generator includes a circuit arrangement for varying the value of the signal in order to vary the preselected depth of evaluation.

In accordance with another aspect of the present invention, the indicator device includes a horizontal sweep generator for deflecting a beam of electrons along a horizontal line of travel across the face of the cathode ray tube at a predetermined rate of speed. The indicator device also includes a vertical sweep generator for deflecting the beam of electrons continuously or in incremental steps along a vertical line of travel at a predetermined rate of speed.

In accordance with another aspect of the present invention, the indicator device takes the form of a storage oscilloscope to produce a composite image of the ultrasonic and other physiological data, the image being retained for at least a period of time corresponding to a vertical sweep of the cathode ray tube.

In accordance with another aspect of the present invention, the monitoring system includes an electrical circuit coupled between the pulse generator and the horizontal sweep generator so that a horizontal sweep of the beam of electrons is initiated by the receipt of a time-spaced pulse from the pulse generator.

In accordance with another aspect of the present invention, the video amplifier is coupled to the intensity control, or the unblanking electrode, of the cathode ray tube.

In accordance with another aspect of the present invention, there is provided a method of diagnosing the functioning of an internal organ. The method includes the steps of generating a train of time-spaced pulses, applying the train of pulses to a transducer, generating ultrasonic waves with the transducer, and receiving reflected ultrasonic waves with a transducer. The method also includes the steps of converting the received ultrasonic waves into electrical signals, applying the electrical signals to an input circuit of a video amplifier, applying signals representative of physiological information to the input circuit of a physiological amplifier, amplifying the physiological signals, and applying the amplified physiological signals to the input circuit of a signal comparator. Also, the method includes the steps of electrically comparing the value of the amplified physiological signals to a reference signal, developing output signals with the signal comparator when the amplified signals attain a predetermined value relative to the reference signal, applying the output signals developed by the comparator to the video amplifier, and applying a control signal with the video amplifier to an indicator device to thereby present an output display representative of ultrasonic data and other physiological data.

In accordance with another aspect of the present invention, the method includes the step of varying the intensity of a cathode ray tube in order to present the output display.

In accordance with another aspect of the present invention, the method includes the step of unblanking a cathode ray tube in accordance with the value of the control signal in order to present the output display.

It is therefore an object of the present invention to provide a monitoring system for presenting a composite presentation of both ultrasound data and other physiological data.

Another object of the present invention is the provision of monitoring systems for presenting in time correlation with respect to each other.

Another object of the present invention is the provision of a clinical monitoring system for simultaneously presenting ultrasonic data and electrocardiograph data on a single display.

Still another object of the present invention is the provision of a monitoring circuit for synchronizing ultrasound data and physiological data and in which the sets of data are correlated with respect to each other relative to time.

A further object of the present invention is the provision of a monitoring circuit in which an ultrasound system is operated in conjunction with another physiological monitoring system, such as an electrocardiograph, so that the sets of data obtained by the ultrasound system and the other physiological monitoring system may be electrically synchronized and combined for a single presentation.

These and other objects and advantages of the invention will become apparent from the following description of the preferred embodiment of the invention and read in conjunction with the accompanying drawings in which:

DESCRIPTION OF A PREFERRED EMBODIMENT

Figure 1:
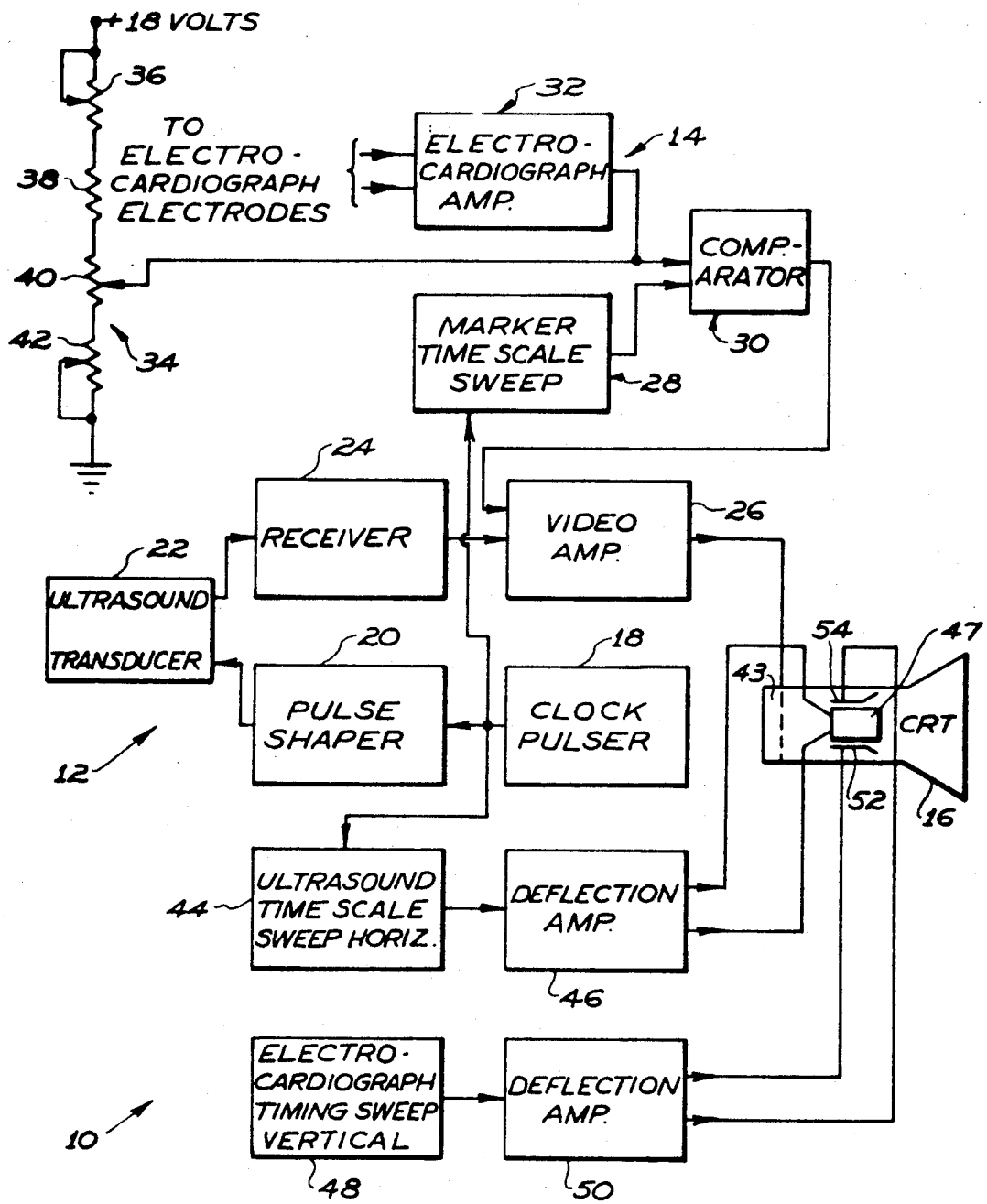
FIG. 1 is an electrical block diagram illustrating in basic form the monitoring system of the present invention.

FIG. 1 illustrates a monitoring system 10 which is generally comprised of an ultrasound system 12 operated in conjunction with an electrocardiograph system 14 for providing a composite image of ultrasonic data and electrocardiograph data on a cathode ray tube 16.

More particularly, the ultrasound system generally includes a clock pulser circuit 18 for applying a train of time-spaced pulses to a pulse shaper network 20. The output signals developed by the pulse shaper network 20 are then applied to an ultrasound transducer, which in turn generates an ultrasonic wave.

Once the emitted ultrasonic wave strikes an object, a reflective wave is returned to the transducer 22, is converted to an electrical signal, and is applied to the receiver 24. The output signal developed by the receiver 24 is then applied to one of the input terminals of a video amplifier 26.

The electrocardiograph system 14 generally comprises a marker time scale sweep circuit 28 having an input terminal connected to the clock pulser circuit 18 and an output terminal connected to one of the input terminals of a comparator circuit 30. The marker time scale sweep circuit 28 generally takes the form of a ramp generator and, upon the receipt of a pulse signal from the clock pulser circuit 18, generates a ramp function signal which is applied to the input terminal of the comparator circuit 30.

The electrocardiograph system also includes an electrocardiograph amplifier 32 having its input terminals connected to a pair of electrocardiograph electrodes, and its output terminal connected to the other input terminal of the comparator circuit 30. Also connected to the latter input terminal of the comparator circuit 30 is the output terminal of a depth selector circuit 34.

The depth selector circuit 34 is comprised of a variable resistor 36, a resistor 38, a potentiometer 40, and a variable resistor 42, all of which are connected in series between the positive terminal of an 18-volt power supply source and ground. The movable contact of the potentiometer 40 provides the output terminal of the depth selector circuit 34 which is connected to an input terminal of the comparator circuit 30. Accordingly, by varying the position of the movable contact of the potentiometer 40, the value of a signal which is applied to the input terminal of the comparator circuit 30 may be varied.

The output terminal of the comparator circuit 30 is connected to another input terminal of the video amplifier 26 and the output terminal of the video amplifier 36 is connected to the unblanking electrode 43 of the cathode ray tube 16. Thus, signals representative of ultrasonic data and signals representative of electrocardiograph data, are combined in the video amplifier 26 in order to provide unblanking signals for the cathode ray tube 16.

An ultrasound time scale horizontal sweep generator 44 is connected through a deflection amplifier 46 to the horizontal deflection plates 47 of the cathode ray tube. The input terminal of the time scale horizontal sweep generator 44 is connected to the output terminal of the clock pulser circuit 18 so that a horizontal sweep of the beam of electrons in the cathode ray tube is initiated upon the receipt of a pulse signal by the horizontal generator 44. Also, an electrocardiograph timing vertical sweep generator 48 is coupled through a deflection amplifier 50 to the vertical deflection plates 52, 54, of the cathode ray tube 16. Accordingly, upon the completion of a horizontal sweep by the horizontal generator 44, the vertical sweep generator 48 deflects the electron beam in the cathode ray tube 16 an incremental distance along a vertical line of travel.

Figure 2:
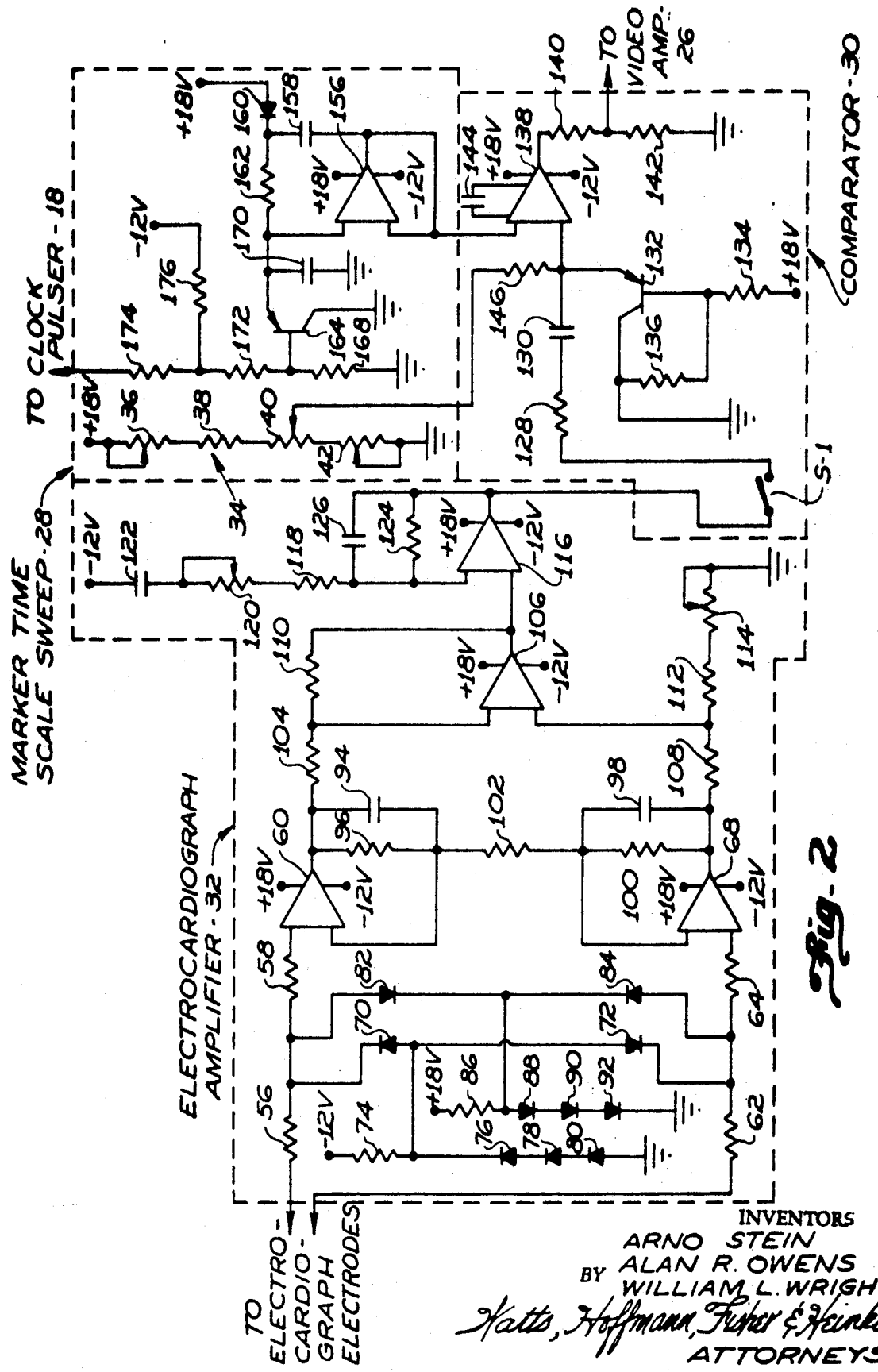
FIG. 2 is an electrical schematic diagram illustrating in more detail the circuitry of portions of the circuitry of the monitoring system shown in FIG. 1; and, FIG. 3 is a graphical representation of a typical presentation of ultrasound data and electrocardiograph data presented in time correlation and as a function of time.

Reference is now made to FIG. 2 which illustrates in more detail the electrical circuitry of the marker time scale sweep circuit 28, the comparator circuit 30, and the electrocardiograph amplifier 32. More particularly, one of the electrocardiograph electrodes is connected through a pair of series-connected resistors 56, 58, to the non-inverting input terminal of a differential amplifier 60. The other electrocardiograph electrode is connected through a pair of series-connected resistors 62, 64, to the non-inverting input terminal of a differential amplifier 68. The differential amplifiers 60, 68, as well as all of the other differential amplifiers in the electrocardiograph amplifier 32, the marker time scale sweep circuit 28, and the comparator circuit 30, are supplied with operating potentials from a positive terminal of the 18-volt supply source and the negative terminal of a 12-volt supply source.

The junction point between the resistor 56 and the resistor 58 is connected to the cathode of a diode 70 having its anode connected to the anode of a diode 72. The cathode of diode 72 is connected to a junction point between the resistor 62 and the resistor 64. The commonly connected anodes of the diodes 70, 72 are connected through a resistor 74 to the negative terminal of the 12-volt supply source and are also connected to the cathode of a diode 76. The anode of diode 76 is connected to the cathode of a diode 78 having its anode connected to the cathode of a diode 80. The anode of diode 80 is connected directly to ground.

The junction point between the resistors 56, 58, is also connected to the anode of a diode 82 having its cathode connected to the cathode of another diode 84. The anode of the diode 84 is connected directly to the junction point between the resistors 62, 64. Also, the commonly connected cathodes of the diodes 82, 84 are connected through a resistor 86 to the positive terminal of the 18-volt supply source and to the anode of a diode 88. The cathode of diode 88 is connected to the anode of a diode 90 having its cathode connected to the anode of a diode 92. In addition, the cathode of diode 92 is connected directly to ground.

The output terminal of the differential amplifier 60 is connected through a parallel connected capacitor 94, resistor 96, to the inverting input terminal of this amplifier. Similarly, the output terminal of the differential amplifier 68 is connected through a parallel connected capacitor 98, resistor 100, to the inverting input terminal of amplifier 68. In addition, the inverting input terminal of amplifier 60 is connected through a resistor 102 to the inverting input terminal of amplifier 68.

The output terminal of differential amplifier 60 is also connected through a resistor 104 to the inverting input terminal of a differential amplifier 106 having its non-inverting input terminal connected through a resistor 108 to the output terminal of differential amplifier 68. The output terminal of amplifier 106 is then connected through a feedback resistor 110 to the inverting input terminal of this amplifier. In addition, the non-inverting input terminal of differential amplifier 106 is connected through a series-connected resistor 112 and variable resistor 114 to ground.

The output terminal of differential amplifier 106 is also connected to the non-inverting input terminal of another differential amplifier 116 having its inverting input terminal connected through a series-connected resistor 118, variable resistor 120, and capacitor 122 to the negative terminal of the 12-volt supply source. The output terminal of amplifier 116 is connected through a parallel-connected resistor 124 and capacitor 126 to the inverting input terminal of this amplifier.

The output terminal of differential amplifier 116 is then connected through a normally open switch S-1 to one of the terminals of a resistor 128 in the comparator circuit 30. The other terminal of resistor 128 is connected through a capacitor 130 to the emitter of a PNP transistor 132 having its base connected through a resistor 134 to the positive terminal of the 18-volt supply source. The base of transistor 132 is connected through a resistor 136 to ground and the collector of this transistor is connected directly to ground.

The emitter of transistor 132 is also connected to the non-inverting input terminal of a differential amplifier 138 and the output terminal of this amplifier is connected through a pair of series-connected resistors 140, 142, to ground. The junction point between the resistors 140, 142 is connected to the video amplifier circuit 26. The differential amplifier 138 includes a compensating network comprised of a capacitor 144.

The non-inverting input terminal of differential amplifier 138 is also connected through a resistor 146 to the movable contact of a potentiometer 40. One of the stationary terminals of the potentiometer 40 is connected through a series-connected resistor 38 and variable resistor 36 to the positive terminal of the 18-volt supply source. The other stationary contact of potentiometer 40 is connected through a variable resistor 42 to ground.

The inverting input terminal of the differential amplifier 158 in the comparator circuit 30 is connected to the inverting input terminal of a differential amplifier 156 in the marker time scale sweep circuit 28. The output terminal of the differential amplifier 156 is connected directly to the inverting input terminal of this amplifier and is also connected to one terminal of a capacitor 158. The other terminal of capacitor 158 is connected to the cathode of a diode 160 having its anode connected to the positive terminal of an 18-volt supply source.

The cathode of diode 160 is also connected through a resistor 162 to the non-inverting input terminal of the differential amplifier 156 and to the emitter of a PNP transistor 164. The base of transistor 164 is coupled through a resistor 168 to ground and the collector of this transistor is connected directly to ground. In addition, the emitter of transistor 164 is coupled through a capacitor 170 to ground and the base of the transistor 164 is connected through a pair of series-connected resistors 172, 174 to the clock pulser circuit 18. Finally, the junction point between the series-connected resistors 172, 174 is coupled through a resistor 176 to the negative terminal of the 12-volt supply source.

The comparator circuit 30 operates by comparing a linear ramp developed by the marker time scale sweep circuit 28 to a direct current voltage developed by the electrocardiograph amplifier 32 for developing an output pulse when the amplitudes of these signals are equal. The linear ramp signal is generated by a bootstrap circuit including the differential amplifier 156. The transistor 164 operates as an emitter follower with its emitter initially operating at approximately zero volts. When a pulse is applied to the transistor 164 from the clock pulser 18, the transistor 164 becomes nonconductive thereby allowing the capacitor 170 to begin charging through the diode 160 and the resistor 162. As the voltage across the capacitor 170 begins to increase in value, the voltage developed by the amplifier 156 begins to increase in value. The voltage developed by amplifier 156 is then applied through the capacitor 158 to the junction point between the diode 160 and the resistor 162. This feedback signal causes the diode 160 to become reverse biased.

As the diode 160 becomes reverse biased, capacitor 170 continues to be charged by the increasing voltage developed at the output of amplifier 156. Since the voltage developed at the output of amplifier 156 increases at the same rate as the increase in voltage across the capacitor 170, there is a constant voltage across the resistor 162. The constant voltage across the resistor 162 causes the capacitor 170 to charge at a constant charging rate to thereby cause the output of the amplifier 156 to increase as a linear ramp function.

The linear ramp signal developed by the amplifier 156 is applied to the inverting input terminal of the differential amplifier 138 in the comparator circuit 30. This linear ramp signal is compared by the amplifier 138 to the voltage developed by the electrocardiograph amplifier 32 which is applied to the non-inverting input terminal of amplifier 138. When these voltages are equal, a negative output signal is developed by the differential amplifier 138 which is applied to the video amplifier 26.

The input signals to the electrocardiograph amplifier 32 are applied to a voltage limiting circuit comprised of the diodes 70, 72, 76, 78, 80, 82, 84, 88, 90, 92 and the resistors 74, 86. The output signals from the voltage limiting circuit are then applied to the non-inverting input terminals of the cross-coupled amplifiers 60, 68. The output signals developed by the amplifiers 60, 68 are then respectively applied to the inverting and non-inverting input terminals of the amplifier 106. The amplifier 106 converts the differential signals applied to the input terminals to a single signal having a value representative of the difference between the differential signals. The output signal from the amplifier 106 is then applied to the non-inverting input terminal of the amplifier 116. The amplifier 116 is biased to have a direct current gain of less than unity and an alternating current gain which is variable over a large positive range. The output signal developed by the amplifier 116 is capacitively coupled through the capacitor 130 to the non-inverting input terminal of the differential amplifier 138.

The signal developed by the depth selector circuit 34 is applied through the resistor 146 to the non-inverting input terminal of the differential amplifier 138 to thereby add to the signal applied by the electrocardiograph amplifier 32. Thus, the potentiometer 148 may be varied to select a desired position for the electrocardiograph trace.

Figure 3:
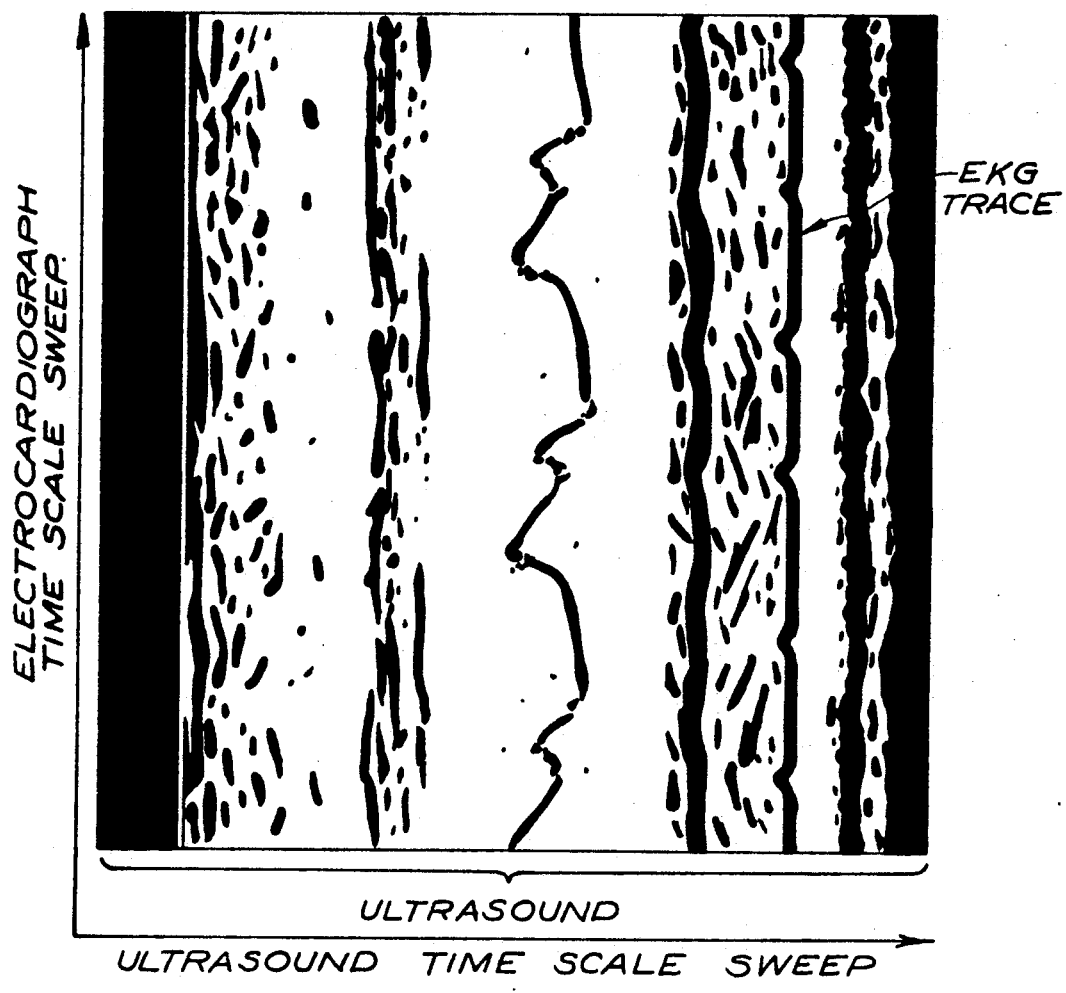

Reference is now made to FIG. 3 which illustrates a typical visual presentation which might be presented on a storage-type cathode ray tube. When the clock pulser 18 commences developing a train of time-spaced pulses, each of these pulses actuates the horizontal sweep generator 46 to cause the beam of electrons to be swept horizontally across the face of the cathode ray tube 16. The first horizontal sweep would be across the bottom portion of the presentation illustrated in FIG. 3. After the completion of the first horizontal sweep, the vertical sweep generator 48 deflects the beam up one increment of beam width and the beam is again swept horizontally in response to the second pulse from the clock pulser 18. This process of horizontal and vertical sweeping or deflecting of the electron beam continues until the beam of electrons has been swept across the entire face of the cathode ray tube.

As the beam is swept across the face of the cathode ray tube, the video amplifier 26 unblanks the beam of electrons in response to both ultrasonic data and electrocardiograph data. When the electrocardiograph signal attains a value equal to the value of the ramp function signal developed by the time scale sweep circuit 28, the comparator circuit 30 is actuated to apply a signal to the video amplifier 26. This signal, when combined with the ultrasonic signal applied to the video amplifier 26, provides an output signal representative of the composite ultrasound and electrocardiograph signals.

Accordingly, with the ultrasound and electrocardiograph signals presented in time correlation, it is possible to compare the relative fluctuations of these signals in order to more precisely evaluate the functioning of an organ in the human body.

Although the invention has been shown in connection with a preferred embodiment, it will be readily apparent to those skilled in the art that various changes in form and arrangements of parts may be made to suit requirements without departing from the spirit and scope of the invention as defined by the appended claims.

Having thus described our invention, we claim:

1. Apparatus for analyzing the functioning of an internal organ comprising:
   pulse generator means for developing a train of time-spaced pulses;
   tranducer means coupled to said pulse generator means for emitting and receiving ultrasonic waves;

circuit means coupled to said transducer means for converting the received ultrasonic waves into electrical signals;

first amplifier means having input circuit means for receiving signals representative of physiological information and output circuit means for amplifying said received signals;

reference signal generator means having an input circuit coupled to said pulse generator means and an output circuit means for developing a reference signal upon the receipt of a time-spaced pulse from said pulse generator means;

signal comparator means having an input circuit coupled to said output circuit means of said amplifier means and said reference signal means, and an output circuit means for developing a signal when a said output signal from said amplifier means reaches a predetermined value with respect to the value of a said reference signal;

second amplifier means having an input circuit coupled to said output circuit means of said signal comparator means and to said circuit means, and having an output circuit means for developing a control signal; and, indicator means coupled to said output circuit means of said second amplifier means for developing an output indication having a value representative of the value of a said control signal to thereby present an indication of both ultrasonic data and other physiological data.

2. An apparatus as defined in claim 1 wherein said first amplifier includes an electrocardiograph amplifier having an input circuit, and a pair of sensing electrodes coupled to the input circuit of the electrocardiograph amplifier.

3. An apparatus as defined in claim 2 including signal generating means coupled to said input circuit of said signal comparator means for developing a signal having a value representative of a preselected position of the other physiological data with respect to the position of the ultrasonic data on the indicator means.

4. An apparatus as defined in claim 1 wherein said indicator means includes a cathode ray tube;

horizontal sweep generator means for deflecting a beam of electrons along a horizontal line of travel across the face of said cathode ray tube at a predetermined rate of speed; and, vertical sweep generator means for deflecting a said beam of electrons in incremental steps along a vertical line of travel at a predetermined rate of speed.

5. An apparatus as defined in claim 4 wherein said indicator means includes circuit means coupled between said pulse generator means and said horizontal sweep generator means for initiating a deflection of a said beam of electrons upon receipt of a time-spaced pulse from said pulse generator means.

6. An apparatus as defined in claim 5 wherein said second amplifier takes the form of a video amplifier, said cathode ray tube includes an intensity control means, and said video amplifier is coupled to said intensity control means to thereby vary the intensity of said cathode ray tube in accordance with the value of said control signal.

7. An apparatus as defined in claim 6 wherein said reference signal generator means takes the form of a ramp function generator means for, upon receipt of a said time-spaced pulse, generating a signal which varies as a ramp function with respect to time.

8 An apparatus as defined in claim 7 including signal generating means coupled to said input circuit of said signal comparator means for developing a signal having a value representative of a preselected depth to be evaluated and having means for varying the value of a said developed signal in order to vary a said preselected depth.

9. An apparatus as defined in claim 7 wherein said first amplifier includes an electrocardiograph amplifier having an input circuit, and a pair of sensing electrodes coupled to the input circuit of the electrocardiograph amplifier.

10. A method of diagnosing the functioning of an internal organ comprising the steps of:
generating a train of time-spaced pulses;
applying said train of pulses to a transducer;
generating an ultrasonic wave with said transducer;
directing the ultrasonic wave toward an object under examination;
receiving from said object a reflected ultrasonic wave with a transducer;
converting said received ultrasonic wave into electrical signals;
applying said electrical signals to an input circuit of a first amplifier;
receiving signals representative of physiological information;
applying said signals representative of physiological information to the input circuit of a second amplifier;
amplifying said physiological representative signals;
applying said amplified physiological representative signals to the input circuit of a signal comparator means;
generating a reference signal;
electrically comparing the value of said amplified signals with said reference signal;
developing an output signal with said signal comparator means when said amplified signals attain a predetermined value relative to said reference signal;
applying said output signal developed by said comparator means to said first amplifier;
developing a control signal having a value representative of said output signal and said electrical signals with said first amplifier;
applying said control signal to said indicator means; and,
presenting an output display with said indicator means when said control signal attains a predetermined value.

11. A method of diagnosing the functioning of an internal organ comprising the steps of:
generating a train of time-spaced pulses;
applying said train of pulses to a transducer;
generating an ultrasonic wave with said transducer;
directing the ultrasonic wave toward an object under examination;
receiving from said object a reflected ultrasonic wave with a transducer;
converting said received ultrasonic wave into electrical signals;
applying said electrical signals to an input circuit of a first amplifier;
receiving signals representative of electrocardiograph data;

applying signals representative of electrocardiograph data to the input circuit of a second amplifier;

amplifying said electrocardiograph signals;

applying said amplified electrocardiograph signals to the input circuit of a signal comparator means;

generating a reference signal;

electrically comparing the value of said amplified signals with said reference signal;

developing an output signal with said signal comparator means when said amplified signals attain a predetermined value relative to said reference signal;

applying said output signal developed by said comparator means to said first amplifier;

developing a control signal having a value representative of said output signal and said electrical signals with said first amplifier;

applying said control signal to said indicator means; and, presenting an output display with said indicator means when said control signal attains a predetermined value.

12. An ultrasound electrocardiograph system comprising:

pulse generator means for developing a train of time-spaced pulses;

transducer means coupled to said pulse generator means for emitting and receiving ultrasonic waves;

circuit means coupled to said transducer means for converting the received ultrasonic waves into electrical signals;

an electrocardiograph amplifier having input circuit means adapted to be coupled to sensing electrodes and output circuit means;

reference signal generator means having an input circuit coupled to said pulse generator means and an output circuit means for developing a reference signal upon the receipt of a time-spaced pulse from said pulse generator means;

signal comparator means having an input circuit coupled to said output circuit means of said electrocardiograph amplifier and to said reference signal means, and an output circuit means for developing a signal when a said output signal from said electrocardiograph amplifier means attains a predetermined value with respect to the value of a said reference signal;

amplifier means having an input circuit coupled to said output circuit means of said signal comparator means and to said converter circuit means, and having an output circuit means for developing a control signal; and, indicator means coupled to said output circuit means of said amplifier means for developing an output indication having a value representative of the value of a said control signal to thereby present an indication of both ultrasonic data and electrocardiograph data.

13. An apparatus as defined in claim 13 wherein said indicator means includes a cathode ray tube;

horizontal sweep generator means for deflecting a beam of electrons along a horizontal line of travel across the face of said cathode ray tube at a predetermined rate of speed; and, vertical sweep generator means for deflecting a said beam of electrons in incremental steps along a vertical line of travel at a predetermined rate of speed.

14. An apparatus as defined in claim 13 wherein said indicator means includes circuit means coupled between said pulse generator means and said horizontal sweep generator means for initiating a deflection of a said beam of electrons upon receipt of a time-spaced pulse from said pulse generator means.

15. An apparatus as defined in claim 14 wherein said second amplifier takes the form of a video amplifier, said cathode ray tube includes an intensity control means, and said video amplifier is coupled to said intensity control means to thereby vary the intensity of said cathode ray tube in accordance with the value of said control signal.

16. Apparatus for analyzing the functioning of an internal organ comprising:

pulse generator means for developing a train of time-spaced pulses;

transducer means coupled to said pulse generator means for emitting and receiving ultrasonic waves;

first signal processing circuit means coupled to said transducer means for converting the received ultrasonic waves into electrical signals;

second signal processing circuit means for developing output signals representative of physiological information;

signal combining circuit means having input circuit means for receiving electrical signals developed by said first signal processing circuit means and output signals developed by said second signal processing circuit means, and output circuit means for developing control signals representative of a composite of the values of said electrical signals and output signals; and, indicator means coupled to said output circuit means of said signal combining circuit means for developing an output indication representative of the value of said composite control signals to thereby present an indication of both ultrasonic data and other physiological data.

17. An apparatus as defined in claim 16 wherein said signal combining circuit means comprises a video amplifier having a first input circuit coupled to said first signal processing circuit means, and a second input circuit coupled to said second signal processing circuit means.

18. An apparatus as defined in claim 17 wherein said second signal processing circuit means includes an electrocardiograph amplifier having an input circuit, and a pair of sensing electrodes coupled to the input circuit of the electrocardiograph amplifier.

19. An apparatus as defined in claim 18 including signal generating means coupled to said second signal processing circuit means for developing a signal having a value representative of a preselected position of the other physiological data with respect to the position of the ultrasonic data on the indicator means.

20. An apparatus as defined in claim 19 wherein said indicator means includes a cathode ray tube;

horizontal sweep generator means for deflecting a beam of electrons along a horizontal line of travel across the face of said cathode ray tube at a predetermined rate of speed; and, vertical sweep generator means for deflecting a said beam of electrons in incremental steps along a vertical line of travel at a predetermined rate of speed.

21. An apparatus as defined in claim 20 wherein said indicator means includes circuit means coupled between said pulse generator means and said horizontal sweep generator means for initiating a deflection of a said beam of electrons upon receipt of a time-spaced pulse from said pulse generator means.

22. Apparatus for analyzing the functioning of an internal organ comprising:
   pulse generator means for developing a train of time-spaced pulses;
   transducer means coupled to said pulse generator means for emitting and receiving ultrasonic waves;
   first signal processing circuit means coupled to said transducer means for converting the received ultrasonic waves into electrical signals;
   second signal processing circuit means for developing output signals representative of electrocardiograph data;
   video amplifier means having input circuit means for receiving electrical signals developed by said first signal processing circuit means and output signals developed by said second signal processing circuit means, and output circuit means for developing control signals representative of both the values of said electrical signals and output signals; and,
   indicator means coupled to said output circuit means of said signal combining circuit means for developing an output indication representative of the value of said control signals to thereby present an indication of both ultrasonic data and electrocardiograph data.

23. An apparatus as defined in claim 22 including signal generating means coupled to said second signal processing circuit means for developing a signal having a value representative of a preselected position of the other physiological data with respect to the position of the ultrasonic data on the indicator means.

24. An apparatus as defined in claim 23 wherein said indicator means includes a cathode ray tube;
   horizontal sweep generator means for deflecting a beam of electrons along a horizontal line of travel across the face of said cathode ray tube at a predetermined rate of speed; and,
   vertical sweep generator means for deflecting a said beam of electrons in incremental steps along a vertical line of travel at a predetermined rate of speed.

25. An apparatus as defined in claim 24 wherein said indicator means includes circuit means coupled between said pulse generator means and said horizontal sweep generator means for initiating a deflection of a said beam of electrons upon receipt of a time-spaced pulse from said pulse generator means.

26. A method of diagnosing the functioning of an internal organ comprising the steps of:
   generating a train of time-spaced pulses;
   applying said train of pulses to a transducer;
   generating an ultrasonic wave with said transducer;
   directing the ultrasonic wave toward an object under examination;
   receiving from said object a reflected ultrasonic wave with a transducer;
   converting said received ultrasonic wave into electrical signals;
   applying said electrical signals to an input circuit of a first amplifier;
   receiving signals representative of physiological information;
   applying said signals representative of physiological information to the input circuit of a second amplifier;
   amplifying said physiological representative signals;
   applying said amplified physiological representative signals to the input circuit of a signal comparator means;
   generating a reference signal;
   electrically comparing the value of said amplified signals with said reference signal;
   developing an output signal with said signal comparator means when said amplified signals attain a predetermined value relative to said reference signal;
   applying said output signal developed by said comparator means to said first amplifier;
   developing a control signal having a value representative of said output signal and said electrical signals with said first amplifier;
   applying said control signal to said indicator means; and,
   varying the intensity of a cathode ray tube with said control signal in order to present an output diaplay.

27. A method of diagnosing the functioning of an internal organ comprising the steps of:
   generating a train of time-spaced pulses;
   applying said train of pulses to a transducer;
   generating an ultrasonic wave with said transducer;
   directing the ultrasonic wave toward an object under examination;
   receiving from said object a reflected ultrasonic wave with a transducer;
   converting said received ultrasonic wave into electrical signals;
   applying said electrical signals to an input circuit of a first amplifier;
   receiving signals representative of physiological information;
   applying said signals representative of physiological information to the input circuit of a second amplifier;
   amplifying said physiological representative signals;
   applying said amplified physiological representative signals to the input circuit of a signal comparator means;
   generating a reference signal;
   electrically comparing the value of said amplified signals with said reference signal;
   developing an output signal with said signal comparator means when said amplified signals attain a predetermined value relative to said reference signal;
   applying said output signal developed by said comparator means to said first amplifier;
   developing a control signal having a value representative of said output signal and said electrical signals with said first amplifier;
   applying said control signal to said indicator means and,
   unblanking a beam of electrons in a cathode ray tube with said control signal in order to present an output display.

28. A method of diagnosing the functioning of an internal organ comprising the steps of:
   generating a train of time-spaced pulses;
   applying said train of pulses to a transducer;
   generating an ultrasonic wave with said transducer;
   directing the ultrasonic wave toward an object under examination;

receiving from said object a reflected ultrasonic wave with a transducer;
converting said received ultrasonic wave into electrical signals;
applying said electrical signals to an input circuit of a first amplifier;
receiving signals representative of electrocardiograph data;
applying signals representative of electrocardiograph data to the input circuit of a second amplifier;
amplifying said electrocardiograph signals;
applying said amplified electrocardiograph signals to the input circuit of a signal comparator means;
generating a reference signal;
electrically comparing the value of said amplified signals with said reference signal;
developing an output signal with said signal comparator means when said amplified signals attain a predetermined value relative to said reference signal;
applying said output signal developed by said comparator means to said first amplifier;
developing a control signal having a value representative of said output signal and said electrical signals with said first amplifier;
applying said control signal to said indicator means; and,
varying the intensity of a cathode ray tube with said control signal in order to present an output display.

29. A method of diagnosing the functioning of an internal organ comprising the steps of:
generating a train of time-spaced pulses;
applying said train of pulses to a transducer;
generating an ultrasonic wave with said transducer;
directing the ultrasonic wave toward an object under examination;
receiving from said object a reflected ultrasonic wave with a transducer;
converting said received ultrasonic wave into electrical signals;
applying said electrical signals to an input circuit of a first amplifier;
receiving signals representative of electrocardiograph data;
applying signals representative of electrocardiograph data to the input circuit of a second amplifier;
amplifying said electrocardiograph signals;
applying said amplified electrocardiograph signals to the input circuit of a signal comparator means;
generating a reference signal;
electrically comparing the value of said amplified signals with said reference signal;
developing an output signal with said signal comparator means when said amplified signals attain a predetermined value relative to said reference signal;
applying said output signal developed by said comparator means to said first amplifier;
developing a control signal having a value representative of said output signal and said electrical signals with said first amplifier;
applying said control signal to said indicator means and,
unblanking a beam of electrons in the cathode ray tube with said control signal in order to present an output display.

* * * * *